Sept. 22, 1925.
E. LOWE
1,554,741
KNUCKLE JOINT CONNECTION
Filed June 30, 1925     2 Sheets-Sheet 1
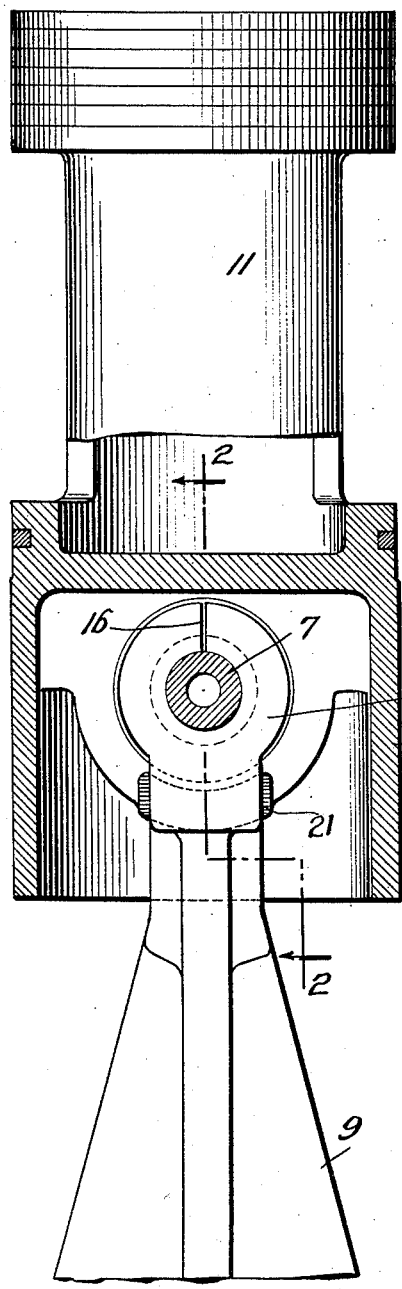
Fig. 1.
Fig. 2.
Fig. 3.
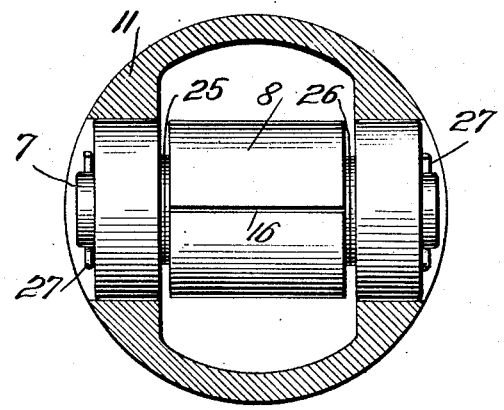
INVENTOR
Elmer Lowe
BY Archibald Cox
his ATTORNEY.

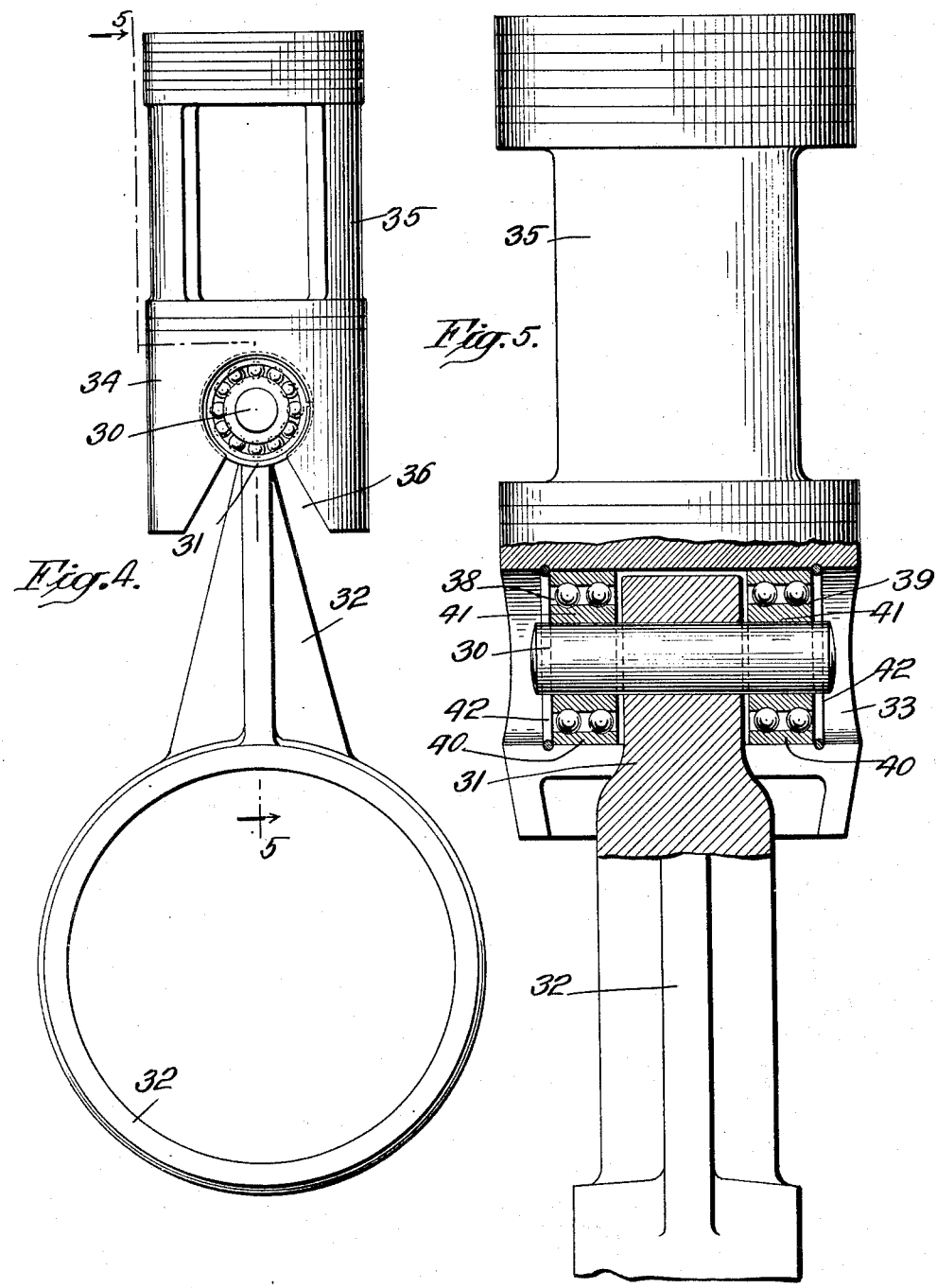

Patented Sept. 22, 1925.

1,554,741

UNITED STATES PATENT OFFICE.

ELMER LOWE, OF NEW BRUNSWICK, NEW JERSEY, ASSIGNOR TO BRUNSWICK-KROESCHELL COMPANY, OF NEW BRUNSWICK, NEW JERSEY, A CORPORATION OF NEW JERSEY.

KNUCKLE-JOINT CONNECTION.

Application filed June 30, 1925. Serial No. 40,483.

*To all whom it may concern:*

Be it known that I, ELMER LOWE, a citizen of the United States, residing at New Brunswick, in the county of Middlesex, in the State of New Jersey, have invented certain new and useful Improvements in Knuckle-Joint Connections, set forth in the following specification.

The invention relates to knuckle joint connections, and more particularly to a knuckle joint connection between a piston and a member pivoted thereto, such as an eccentric strap or the like.

A knuckle joint connection of the type to which this invention relates usually comprises a wrist or knuckle pin positioned transversely in the upper end or head of the eccentric strap, the outer ends of the pin being adapted to be received in a cylindrical bore formed transversely in the lower end of the piston. As heretofore constructed these knuckle joint connections have been what might be termed "frictional" bearings. One object of the present invention is to produce an improved knuckle joint connection for a piston and the member pivoted thereto, so constructed and arranged as to reduce all wear and friction in the joint to a minimum. Another object of the invention is to so construct a knuckle joint connection as to facilitate the machining of the parts so as to increase accuracy in workmanship and reduce the cost of production. A further object of the invention is to so arrange the parts of the knuckle joint connection as to facilitate the assembly or disassembly of them. To these ends the invention consists in the improved knuckle joint connection hereinafter described and particularly pointed out in the appended claims.

In the accompanying drawings illustrating the preferred form of the invention, Fig. 1 is a side elevation of a piston and the upper end of an eccentric strap employing the improved knuckle joint connection (the sectional part of this figure being taken along the line 1—1 of Fig. 2); Fig. 2 is a section taken on the line 2—2 of Fig. 1; Fig. 3 is a transverse section taken along the line 3—3 of Fig. 2; Fig. 4 is a side elevation of a piston and eccentric strap employing a modified form of knuckle joint connection; and Fig. 5 is an enlarged front elevation of the parts shown in Fig. 4, the sectional portion of Fig. 5 being taken along the line 5—5 of Fig. 4.

The improved knuckle joint connection, as illustrated in Figs. 1, 2 and 3, comprises a case-hardened wrist pin 7 (preferably hollow) held in a transverse hole in the upper end or head 8 of the eccentric strap 9. The two ends of the pin 7 project laterally from the head of the eccentric strap and are received in the transverse bore 10 in the lower end of the piston 11. A pivotal connection between the projecting ends of the wrist pin 7 and the bore 10 in the piston is made by means of the anti-friction bearings generally indicated at 13 and 14.

In order to prevent lost play caused by wear or by "peening" action between the pin and the hole in the head of the eccentric strap in which the pin is received, the hole in the head of the eccentric strap is bored somewhat smaller (about .002″ in practice) than the diameter of the wrist pin. The top end of the eccentric strap is then slotted at 16, so that when the wrist pin is inserted into the hole, the sides of the head will exert a clamping action on the pin. This clamping action of the split head of the eccentric strap upon the pin prevents the pin from turning and thereby eliminates wear and at the same time compensates for any peening action.

In preparing the transverse bore 10 in the lower part of the piston to receive the outer shells or race-ways 18 of the anti-friction bearings, the transverse bore is first machined to approximately .002″ smaller than the outside diameter of the outer race-ways 18. The transverse bore in the piston is then ground or subjected to the action of a rolling device, or is both ground and rolled, until the diameter of the bore is approximately .0005″ greater than the outside of the outer race-ways 18, thus making a light "sucking" fit between the race-ways and the bore. By rolling or grinding the bore 10 in the piston the irregularities in the surface of the metal left by the cutting tool are either crushed or ground out so that the peening effect caused by the rise and fall of the piston is practically eliminated and the tight fit between the race-ways 18 and the bore 10 is maintained throughout the life of the machine. The projecting ends of the wrist pin 7 which are adapted to be received in the inner shells or race-ways 19 of the anti-friction bearings are made substantially .0002" larger in diameter than the opening in the race-ways 19.

In assembling the eccentric strap in the piston by means of the improved knuckle joint connection the upper end of the eccentric strap is inserted up into the recess 23 in the skirted lower end of the piston, the head of the strap being positioned laterally between the arc-shaped bearing surfaces 20 and 21 (Fig. 2) formed in the inner wall of the skirt 24 of the piston and under the transverse bore 10. By providing these bearing surfaces 20 and 21 for centering the head of the eccentric strap and keeping it in operative position, there is no side thrust between the head of the strap and the anti-friction bearings. The wrist pin is next tapped into place in the hole in the head of the strap with the ends thereof projecting equal distances from each side of the head. The spacing washers 25 and 26 are next slipped over the projecting ends of the wrist pin as far as the sides of the head of the strap, after which the anti-friction bearings 13 and 14 are inserted in place in the bore 10 and shoved against the outer sides of the spacing washers 25 and 26. When the parts are all properly assembled, the anti-friction bearings are held in place by means of the cotter pins 27.

By using an eccentric strap with a slotted head permitting the wrist pin to be tapped into place after the head of the strap has been inserted up into the piston, the lower end 24 of the piston may be made full skirted, that is to say, entirely cylindrical, as indicated in Fig. 1, the front or removed end of the lower side of the piston being exactly the same as the parts shown.

The modified form of knuckle joint connection shown in Figs. 4 and 5 comprises a wrist pin 30 fitted into a hole in the upper end or head 31 of the eccentric strap 32. The head 31 of the eccentric strap is received within a bore 33 formed transversely in the lower end or skirted portion 34 of the piston 35. The bore 33 opens into the flared opening 36 of the skirt of the piston to permit the upper end of the eccentric strap and the pin to be slipped therethrough and placed in position within the skirt portion of the piston in assembling the parts together. This mode of operation is necessary in this form of knuckle joint connection because the wrist pin 30 is forced tightly into the transverse hole in the head of the eccentric strap and remains permanently therein, the parts being assembled and disassembled by moving the upper end of the eccentric strap transversely across the lower end of the piston through the flared opening 36.

The ends of the wrist pin 30 extending laterally from each side of the head 31 of the eccentric strap 32 are connected with the bore 33 in the skirt portion 34 of the piston by means of the anti-friction bearings generally indicated at 38 and 39. The transverse bore 33 is substantially .001" larger in diameter than the outside diameter of the outer race-ways 40 of the anti-friction bearings, thereby making it a sucking fit. The inside diameter of the inner race-ways 41 of the anti-friction bearings are substantially .0002" smaller in diameter than the ends of the hardened wrist pin 30, thereby making the fit between the inner race-ways and the pin a light tapping fit.

In assembling the piston and the eccentric strap of this form of knuckle joint connection the case hardened wrist pin is first driven into the transverse opening in the head of the eccentric strap with the two ends of the pin projecting equal distances from each side of the head of the strap. The head of the eccentric strap is then placed in the lower end of the piston and the anti-friction bearings are tapped into place. The whole structure is centered and held in place by means of the snap rings 42 received in grooves in the outer ends of the transverse bore 33 in the piston.

Having thus described the invention what I claim as new is:—

1. A knuckle joint connection between a piston and a member having its head portion received within a recess in the piston comprising, a pin positioned in a transverse bore in the head of the member with its ends projecting laterally from each side of the head of the member and adapted to be received in a transverse bore in the skirt portion of the piston, the head of the member being slotted so that the sides thereof will exert a clamping effect upon the middle portion of the pin, and an anti-friction bearing between each projecting end of the pin and the adjacent part of the transverse bore in the piston.

2. A knuckle joint connection between a piston and a member having its head portion received within a recess in the piston comprising, a pin positioned in a transverse bore in the head of the member and having its end portions projecting laterally from the head of the member to be received within a transverse bore in the skirt portion of the piston, an anti-friction bearing between each projecting end of the pin and the adjacent part of the bore in the piston, and a bearing surface under each anti-friction bearing adapted to engage with and center the head of the member in the recess in the piston.

3. A knuckle joint connection between a piston and a member having its head portion received within a recess in the piston comprising, a pin positioned in a transverse bore in the head of the member and having its ends projecting from each side of the head of the member to be received in the ends of a transverse bore in the piston, and an anti-friction bearing between each projecting end of the pin and the adjacent part of the bore of the piston.

4. A knuckle joint connection between a piston and a member having its head portion received within a recess in the piston comprising, a pin positioned in a transverse bore in the head of the member and having its ends projecting from each side of the head of the member to be received in the ends of a transverse bore in the piston, the head of the member being slotted so that the sides thereof will exert a clamping effect upon the middle portion of the pin, an anti-friction bearing between each projecting end of the pin and the adjacent part of the bore and the piston, spacing washers between each side of the head of the member and the inner surface of the adjacent anti-friction bearing, and a bearing surface under each anti-friction bearing for engagement with the sides of the head to center the head within the recess in the piston.

ELMER LOWE.